2,784,196
PROCESS FOR THE PREPARATION OF THIAZOLIC DERIVATIVES

Tullio Bacchetti, Milan, Italy, assignor to Carlo Erba S. p. A., Milan, Italy

No Drawing. Application July 18, 1955, Serial No. 522,845

6 Claims. (Cl. 260—306.7)

The present invention refers to the preparation of organic compounds of the general formula:

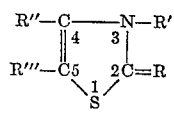

where R is O, S or phenylimino, R' is phenyl, R" is lower alkyl and R''' is hydrogen or lower alkyl.

The new method of preparation is based on the reaction of an α-mercaptocarbonilic compound:

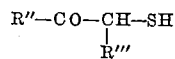

with carbimidic compounds of the general formula:

$$R'-N=C=R$$

in order to form the intermediate compounds:

which, either by dry heating or in solution or else by means of drying agents lose a molecule of water forming the thiazolic derivatives:

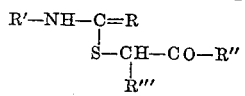

The isolation of the intermediates is unnecessary since the reaction gives the thiazolic derivatives also directly.

This new method is of general use for all of the α-mercaptoketones and also for the derivatives containing R" different from those indicated above. It is particularly easy to work and gives very high yields (superior to 70%).

The new compounds thus obtained have shown "in vitro" to be very active as anthelminthics and very little toxic: therapeutic use is foreseen.

Example 1

10 g. of mercaptoacetone are added to 13.2 g. of phenylisocyanate and heated for 6 hours at steam bath temperature.

By cooling the mixture gives a brown precipitate which is crystallized from alcohol. It can contain variable quantities of diphenylurea formed through action of the water on phenylisocyanate. The product is then dissolved in benzene in which diphenylurea is little soluble, the solution is filtrated and by concentration of the solvent about 16 g. of 4-methyl-3-phenyl-thiazolone-2 (white crystalline powder, M. 149–150° C.) are obtained.

Example 2

10 g. of 3-mercaptobutanone-2 and 12 g. of phenylisocyanate are heated for about 7 hours. The crystals can be separated and recrystallized from alcohol. About 20 g. of 4,5-dimethyl-3-phenylthiazolone-2 (white crystalline powder, M. 100–102° C.) are obtained.

Example 3

6 g. of 1-mercaptobutanone-2 are added to 10.4 g. of carbodiphenylimide. The mixture is slowly heated up to 125° C. and this temperature is maintained until, by cooling, a sample is solidified. Finally by crystallizing from alcohol about 10 g. of 2-phenylimino-3-phenyl-4-ethyl-Δ4 thiazoline (white crystalline powder, M. 115° C.) are obtained.

Example 4

One mole of 3-mercaptobutanone-2 is mixed with 1 mole of phenylisothiocyanate and heated between 40 and 80° C. until crystals start separating. The mixture is cooled and then crystallized from alcohol. The 3-phenyl-4,5-dimethylthiazolthione-2 (yellow crystalline powder, M. 103–104° C.) is obtained.

Example 5

According to the process described in Example 4, 4-ethyl-3-phenylthiazolthione-2 (9 g. of white powder, M. 110–112° C.) can be obtained from 6 g. of 1-mercaptobutanone-2 and 6.3 g. of phenylisothiocyanate.

I claim:

1. Process for the preparation of thiazolic derivatives with anthelminthic action of the general formula:

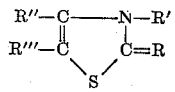

wherein R is selected from the group consisting of O, S and phenylimino, R' is phenyl, R" is lower alkyl and R''' is selected from the group consisting of hydrogen and lower alkyl, characterized by reacting an α-mercaptocarbonilic compound of the general formula:

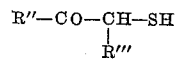

with carbimidic compounds of the general formula:

$$R'-N=C=R$$

2. Process for the preparation of 4-methyl-3-phenyl-thiazolone-2

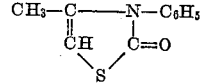

characterized by reacting mercaptoacetone with phenylisocyanate.

3. Process for the preparation of 4,5-dimethyl-3-phenylthiazolone-2

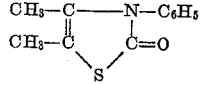

characterized by reacting 3-mercaptobutanone-2 with phenylisocyanate.

4. Process for the preparation of 2-phenylimino-3-phenyl-4-ethyl-Δ4-thiazoline:

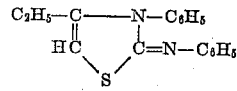

characterized by reacting 1-mercaptobutanone-2 with carbodiphenylimide.

5. Process for the preparation of 3-phenyl-4,5-dimethylthiazolthione-2:

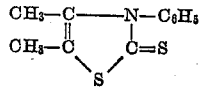

characterized by reacting 3-mercaptobutanone-2 with phenylisothiocyanate.
6. Process for the preparation of 4-ethyl-3-phenyl-thiazolthione-2:
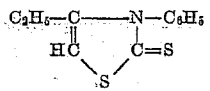
characterized by reacting 1-mercaptobutanone-2 with phenylisothiocyanate.
References Cited in the file of this patent
Beilstein: Handbuch der Org. Chem., vol. 27, pp. 155–56 (1936).